United States Patent
Merritt et al.

(10) Patent No.: US 7,014,761 B2
(45) Date of Patent: Mar. 21, 2006

(54) ENVIRONMENTALLY FRIENDLY DUAL LUBE VENTURI FILTER CARTRIDGE

(75) Inventors: Steven J. Merritt, Kearney, NE (US); Gene W. Brown, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 422 days.

(21) Appl. No.: 10/457,110

(22) Filed: Jun. 9, 2003

(65) Prior Publication Data

US 2003/0226795 A1   Dec. 11, 2003

Related U.S. Application Data

(60) Provisional application No. 60/387,196, filed on Jun. 7, 2002, provisional application No. 60/387,235, filed on Jun. 7, 2002.

(51) Int. Cl.
*B01D 24/00* (2006.01)
*B01D 36/02* (2006.01)
*B01D 35/26* (2006.01)

(52) U.S. Cl. .............. 210/254; 210/238; 210/265; 210/416.5; 210/450; 210/456; 210/470; 210/342; 210/323.2; 210/DIG. 13

(58) Field of Classification Search ......... 210/DIG. 13
See application file for complete search history.

(56) References Cited

U.S. PATENT DOCUMENTS

| | | | |
|---|---|---|---|
| 2,196,821 A | 4/1940 | Arnold | |
| 2,411,539 A | 11/1946 | Gunn | |
| 2,537,992 A | 1/1951 | Gross et al. | |
| 2,601,404 A | 6/1952 | Lasky | |
| 2,843,268 A | 7/1958 | Kennedy | |
| 2,942,572 A | 6/1960 | Pall | |
| 3,056,499 A | 10/1962 | Emond | |
| 3,591,010 A * | 7/1971 | Pall et al. | 210/493.1 |
| 4,324,660 A | 4/1982 | Peyton et al. | |
| 4,501,660 A | 2/1985 | Hebert | |
| 4,557,829 A | 12/1985 | Fields | |
| 4,655,914 A | 4/1987 | Wada | |
| 4,733,449 A | 3/1988 | Spearman | |
| 4,802,979 A | 2/1989 | Medley, III | |

(Continued)

FOREIGN PATENT DOCUMENTS

EP        0287527 A2    10/1988

(Continued)

*Primary Examiner*—W. L. Walker
*Assistant Examiner*—Krishnan S. Menon
(74) *Attorney, Agent, or Firm*—Leydig, Voit & Mayer, Ltd.

(57) ABSTRACT

An environmentally friendly dual lube venturi filter cartridge which has no metallic components. A plastic centertube having a venturi section supports a bypass filter element on standoffs molded into the centertube. An outer concentric full flow filter element surrounds the bypass filter. The full flow filter is supported on a plastic centertube which creates a gap between it and the bypass filter. A first bypass filter endcap both seals the bypass filter and provides standoffs for allowing full flow oil around the bypass filter. The standoffs thus split the full flow which progresses through the primary filter in two paths, a primary path around the bypass filter and into the centertube, and a bypass path through the secondary filter and the venturi. Plastic upper and lower endcaps carry grooves for simple sealing gaskets, a radial seal gasket on the bottom which seals against both the endcap which carries it and a flange in the housing, and an axial seal gasket at the top.

18 Claims, 7 Drawing Sheets

U.S. PATENT DOCUMENTS

| | | | |
|---|---|---|---|
| 4,832,836 | A | 5/1989 | Selsdon |
| 4,872,976 | A | 10/1989 | Cudaback |
| 5,078,877 | A | 1/1992 | Cudaback et al. |
| 5,089,131 | A | 2/1992 | Gentry |
| 5,180,490 | A | 1/1993 | Eihusen et al. |
| 5,234,585 | A | 8/1993 | Zuk |
| 5,236,579 | A | 8/1993 | Janik et al. |
| 5,342,511 | A | 8/1994 | Brown et al. |
| 5,447,627 | A | 9/1995 | Loafman et al. |
| 5,490,930 | A | 2/1996 | Krull |
| 5,525,226 | A | 6/1996 | Brown et al. |
| 5,527,463 | A | 6/1996 | Morgan |
| 5,538,542 | A | 7/1996 | Watanabe et al. |
| 5,538,543 | A | 7/1996 | Watanabe et al. |
| 5,660,802 | A | 8/1997 | Archer et al. |
| 5,685,985 | A | 11/1997 | Brown et al. |
| 5,695,637 | A | 12/1997 | Jiang et al. |
| 5,702,592 | A | 12/1997 | Suri et al. |
| 5,702,602 | A * | 12/1997 | Brown et al. ............... 210/342 |
| 5,738,785 | A | 4/1998 | Brown et al. |
| 5,772,881 | A | 6/1998 | Stockhowe et al. |
| 5,888,383 | A | 3/1999 | Cox |
| 5,904,357 | A | 5/1999 | Demirdogen et al. |
| 5,906,736 | A | 5/1999 | Bounnakhom et al. |
| 5,996,810 | A | 12/1999 | Bounnakhom et al. |
| 6,024,229 | A | 2/2000 | Ayers |
| 6,045,693 | A | 4/2000 | Miller et al. |
| 6,235,194 | B1 | 5/2001 | Jousset |
| 6,322,697 | B1 | 11/2001 | Hacker et al. |
| 6,478,958 | B1 * | 11/2002 | Beard et al. ............. 210/323.2 |
| 6,555,000 | B1 | 4/2003 | Knight |
| 2002/0043495 | A1 | 4/2002 | Beard et al. |

FOREIGN PATENT DOCUMENTS

| | | |
|---|---|---|
| EP | 1 118 368 A3 | 2/2002 |
| WO | WO 86/03687 A1 | 7/1986 |

* cited by examiner

ENVIRONMENTALLY FRIENDLY DUAL LUBE VENTURI FILTER CARTRIDGE

CROSS-REFERENCE TO RELATED PATENT APPLICATIONS

This patent application claims the benefit of U.S. Provisional Patent Application Nos. 60/387,196 and 60/387,235, both filed on Jun. 7, 2002.

FIELD OF THE INVENTION

This invention relates to filters, and more particularly to a dual lube venturi cartridge filter.

BACKGROUND OF THE INVENTION

Venturi dual flow filters are described and claimed in U.S. Pat. No. 6,478,958, assigned to the assignee of the present invention. Those filters have the desirable characteristic of filtering all of the oil through a primary filter, then filtering a predetermined percentage of the oil through a secondary higher density filter. A venturi tube is used to provide a passageway for all of the flow of filtered fluid back to the engine. The majority of flow in the passageway is passed through the primary filter only. The size and positioning and characteristics of the venturi in the tube, along with the flow rate, determines the percentage of oil which is brought through the secondary filter and the venturi port to join with the primary flow back to the engine.

Filters of this type, while presenting useful filtering advantages, can present a disposal problem. Due to ease of installation, many applications prefer the spin-on cartridges disclosed in the aforementioned patent. These have a metal outer case, a metal baseplate, and other metal components within the filter. Even if replaceable cartridges were utilized, they also have significant metal components, often in the form of centertubes or support grids for supporting the filter element, and metal endcaps for sealing the ends of the filter and maintaining relative position of the components. Thus, significant elements of filters of this type will not burn, preventing the use of incineration for relatively complete disposal of the spent filters or filter cartridges.

BRIEF SUMMARY OF THE INVENTION

In view of the foregoing, it is a general aim of the present invention to provide an environmentally friendly filter cartridge, capable of being incinerateable, and capable of functioning as a dual lube venturi cartridge filter. The cartridge is environmentally friendly in that it contains no metallic parts.

In practicing the invention, the cartridge can be made from a limited class of materials, preferably all incinerateable. The materials include the media (normally cellulose or perhaps polyester with plastic backing), plastic elements such as centertubes and endcaps, rubber gaskets, and potting compound (epoxy, plastisol, hot melt or urethane), all of which are incinerateable. The fact that the cartridge will burn and is lightweight (due to no metal parts) simplifies disposal.

In a particular embodiment, the invention provides an environmentally friendly dual lube filter cartridge which contains no metal parts. A non-metallic venturi centertube has a venturi throat associated with at least one venturi port. A bypass filter is arranged coaxial with the venturi centertube. Ribs on the venturi centertube support the bypass filter and create a first flow passage between the bypass filter and the venturi port. A full flow filter having a non-metallic centertube is mounted coaxial with the bypass filter. The full flow centertube has a bore which is larger than the outer periphery of the bypass filter so as to create a second flow passage for single filtered fluid. A first plastic endcap seals a first end of the bypass filter and the associated end of the venturi centertube. The first endcap has projections for creating a flow path for single filtered fluid from the second flow passage to the venturi centertube. A second plastic endcap joins all of the components including the liner, the full flow filter, the bypass filter and the venturi centertube. The second endcap has a central passage connected to the venturi centertube for flow of oil from the cartridge. The second endcap also has an annular peripheral groove near its outer periphery for receiving a skirt-like radial seal gasket. A third plastic endcap encloses the upper end of the cartridge and is sealingly joined to the full flow filter element. The standoffs on the first endcap provide a flow passage between the bypass element and the third endcap. The third endcap has an annular peripheral groove on its outer periphery for carrying a simple flange-like radial seal gasket.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

The function of the dual lube venturi cartridge is to provide full flow filtration of engine lubricating oil and bypass filtration of the lubricating oil, all in one cartridge. The venturi provides a means of bleeding the oil filtered by both the full flow and bypass filter media into one stream, allowing the cartridge housing to function with only one inlet and one outlet. The theory behind the operation of a venturi cartridge is fully described in the aforementioned U.S. Pat. No. 6,478,958, the disclosure of which is incorporated herein by reference.

The cartridge of the present invention, in contrast to that disclosed in the aforementioned patent, contains no metallic parts and is thus environmentally friendly. This makes disposal of the cartridge a relatively simple matter.

Figure 1:
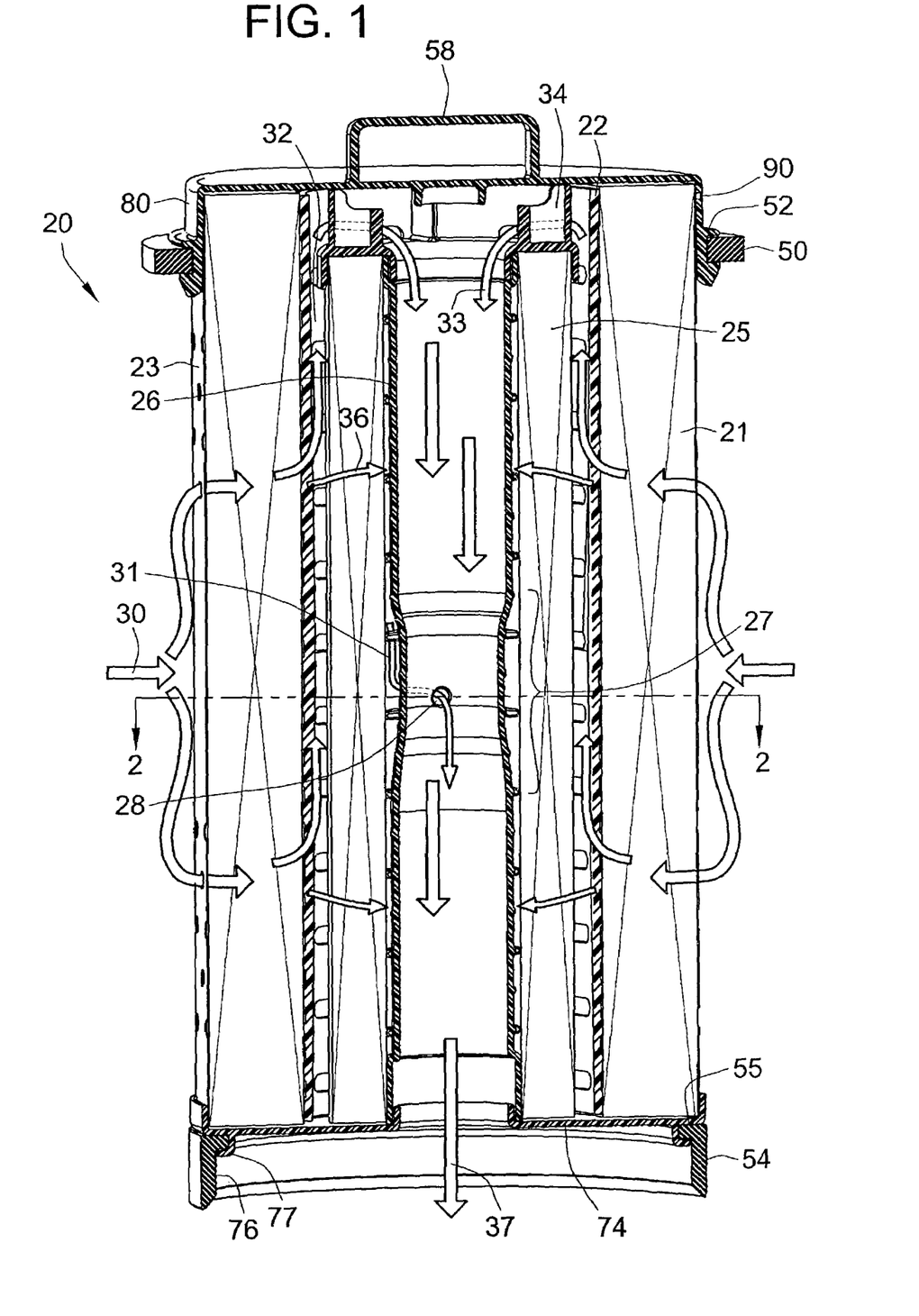
FIG. 1 is an elevational cross-section showing a dual lube venturi filter cartridge constructed in accordance with the present invention.
Figure 2:
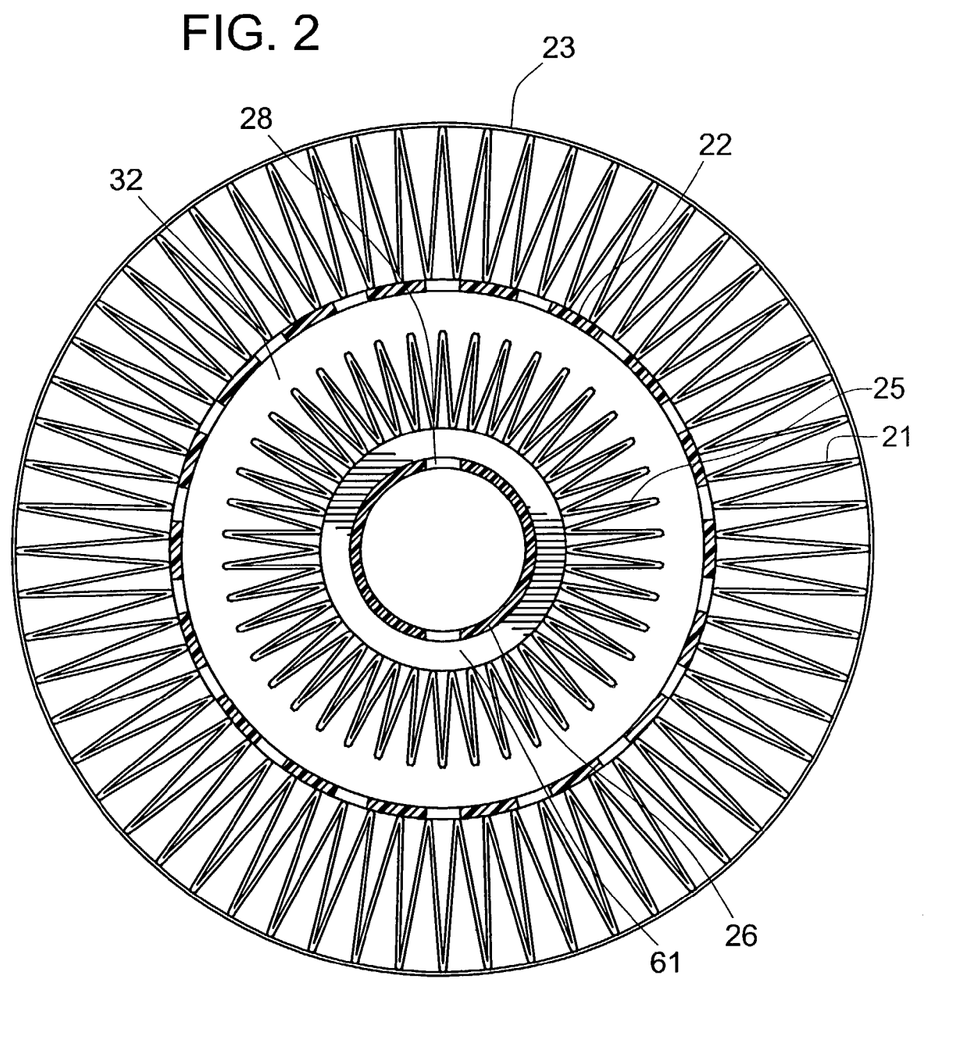
FIG. 2 is a cross-sectional view taken along the line 2—2 of FIG. 1.

Turning then to FIG. 1, there is shown an elevational cross-section of a cartridge 20 constructed in accordance with the present invention. The cartridge includes a full flow filter 21 which is supported by a plastic centertube 22 and, when desired, covered by an outer perforated liner 23. Full flow filter 21 is concentric with a bypass filter 25 which is slipped over and supported on a venturi centertube 26. (See also FIG. 2) The filter elements 21, 25 are preferably pleated paper (cellulose or perhaps polyester with plastic backing). It will be seen that the centertube 26 has a venturi section or throat 27 including one or more venturi ports 28 intended to draw flow from the flow passage between the inside of the bypass filter 25 and the outside of the venturi tube 26. The filter elements and associated components are sealed in only three plastic endcaps, as will be described below.

The housing into which the cartridge is fit is not shown in FIG. 1. But with an exemplary housing, to be described below, the housing would provide an inlet of unfiltered oil at 30 which would be distributed around the exterior periphery of the full flow filter 21. The fluid would pass through the filter to the flow channel 32 created between the inside of the centertube 22 and the outside of the bypass filter 25. The full flow through the primary filter then splits into two paths, a full flow path and a bypass path. In most applications, the majority of the flow, the primary flow, would be along the arrows 33 to pass between flow passages generally indicated at 34 into the center of the venturi centertube. This full flow accelerates through the throat 27 of the venturi to create a differential pressure which will tend to draw oil from the flow passage 32 to the flow passage 31 which exists between the inside of the bypass filter and the outside of the venturi tube. This smaller predetermined flow, the bypass flow, is indicated by the reference numeral 36. The two flows 33 and 36 will join in the venturi tube to create an output flow 37 which is substantially equal to the inlet flow 30. All of the oil in the outlet flow 37 has been filtered by the primary filter 21, and a predetermined percentage has also been filtered by the secondary filter 25.

Figure 3:
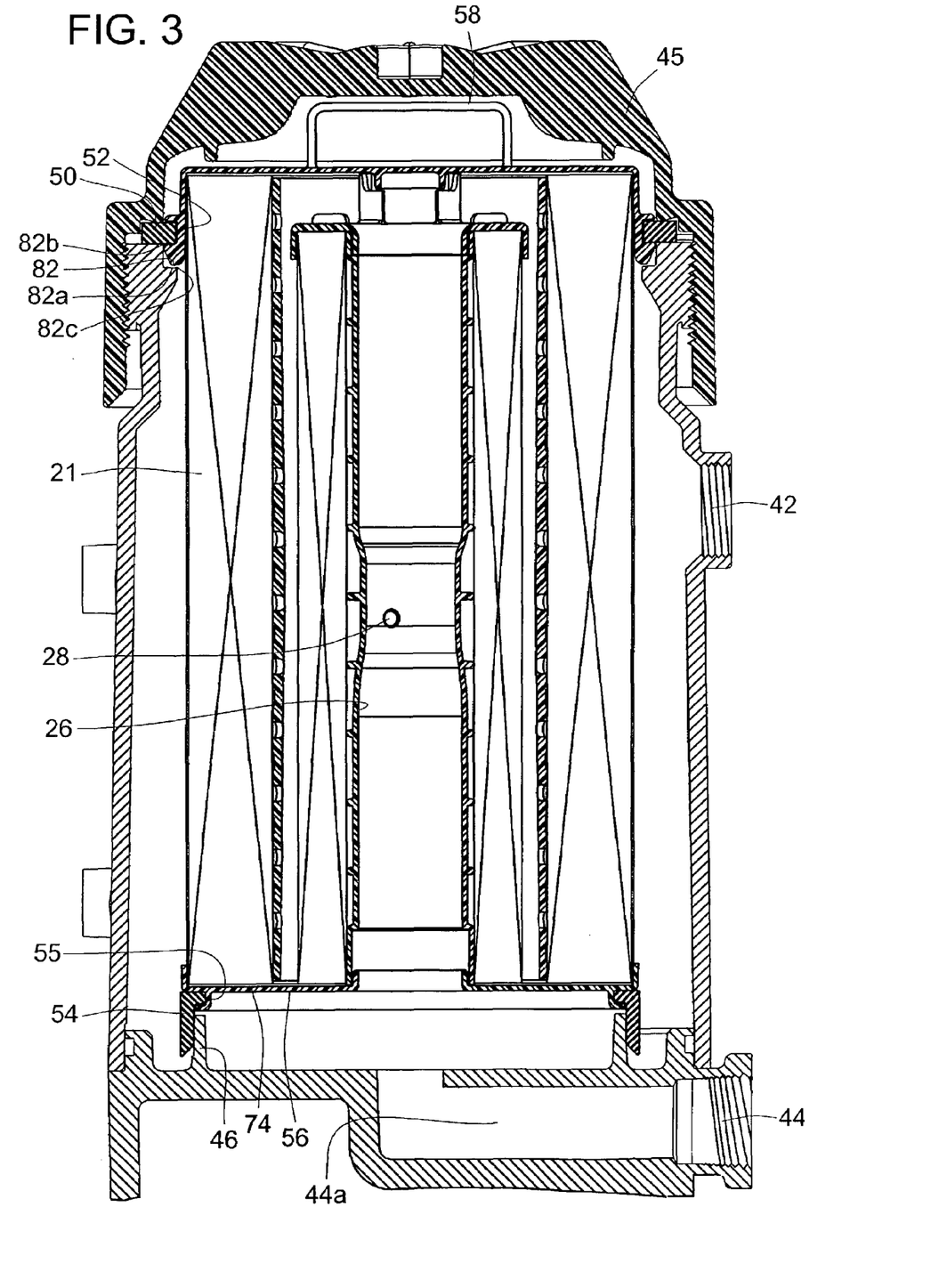
FIG. 3 is an elevational view showing the cartridge of FIG. 1 in a filter housing.

FIG. 3 shows an exemplary housing into which the filter of FIG. 1 can be fit. It will be seen that in the exemplary housing inlet fluid is provided through an inlet port 42. In the illustrated filter construction, the outer liner 23 is constructed with no perforations near the axial center of the filter (see the left side of FIG. 1), where the main oil flow impinges on the filter, in order to protect the filter from direct oil flow as it enters the cartridge housing. The housing has an outlet port 44 which is connected by an internal passage 44a in the housing to the venturi centertube 26, for receiving the total output flow from the filter. The housing has a removable cap 45 which is threaded onto the housing to compress an axial seal gasket 50 set in an annular groove 52 on the periphery of the upper endcap. The lower portion of the housing has an annular flange 46 against which seats the radial seal gasket 54 which is fit in an annular groove 55 formed in the lower endcap 56. If desired, a handle 58 can be formed in the upper endcap to assist in removing the filter from the housing. The housing can have other ports and apparatuses associate therewith, none of which are important to an understanding of the cartridge of the present invention, to which attention will now be returned.

Figure 4:
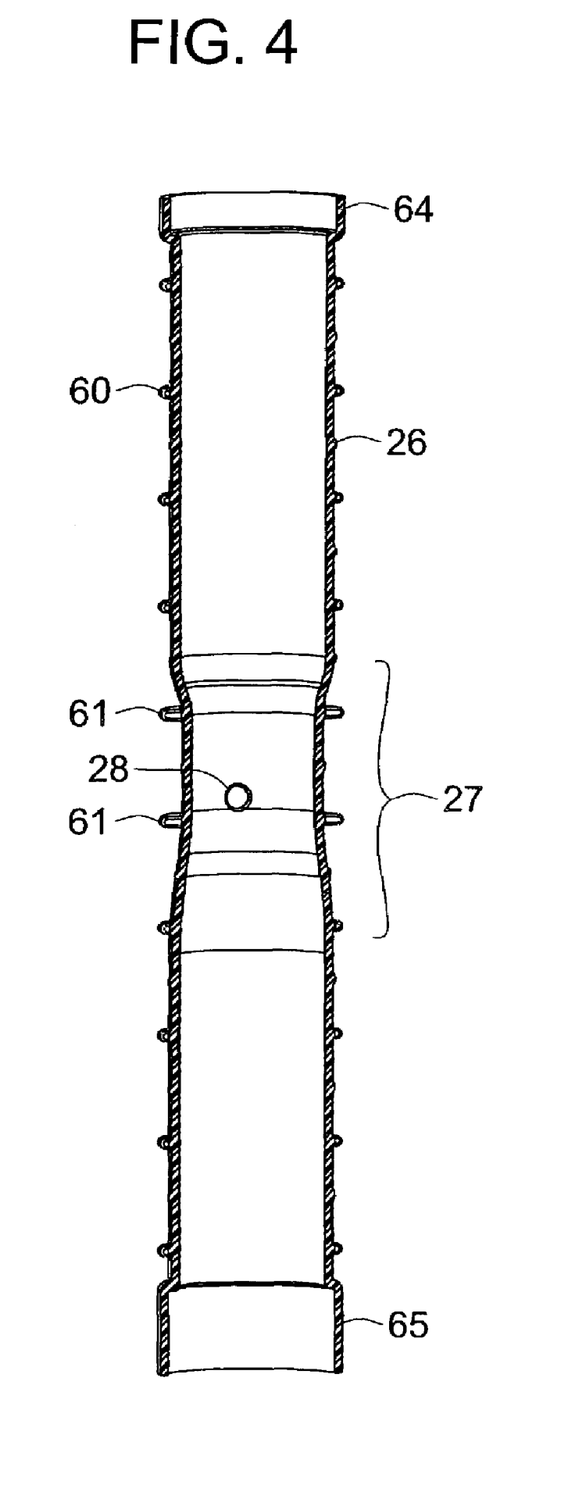
FIG. 4 is a cross-sectional view showing the venturi centertube of the embodiment of FIG. 1.

The construction of the dual lube venturi filter cartridge starts with pre-assembling certain subassemblies. A first is the bypass element subassembly which is based on the venturi centertube 26 shown in FIG. 4. The centertube 26 is preferably molded plastic. As previously described it has a restricted venturi throat 27 having a plurality of venturi ports 28 formed in the throat area. Conveniently, the tube 26 includes a plurality of raised ribs 60 which, as will be seen below, tends to support the inside of the bypass filter while creating the aforementioned flow passage 32 (see FIG. 2) between the outside of the centertube 26 and the inner bore of the bypass filter 25. The protrusions 61 in the area of the venturi throat are preferably larger than those at the ends of the venturi tube so as to present a relatively constant circumference for receipt of and support of the bypass filter. As a further convenience in supporting the bypass filter and aiding the molding of the ends of the centertube into respective endcaps, the centertube 26 terminates in a pair of end flanges 64, 65. Preferably the outer circumference of the flanges 64, 65 is about the same as the outer circumference of the ribs 60, 61.

Figure 5:
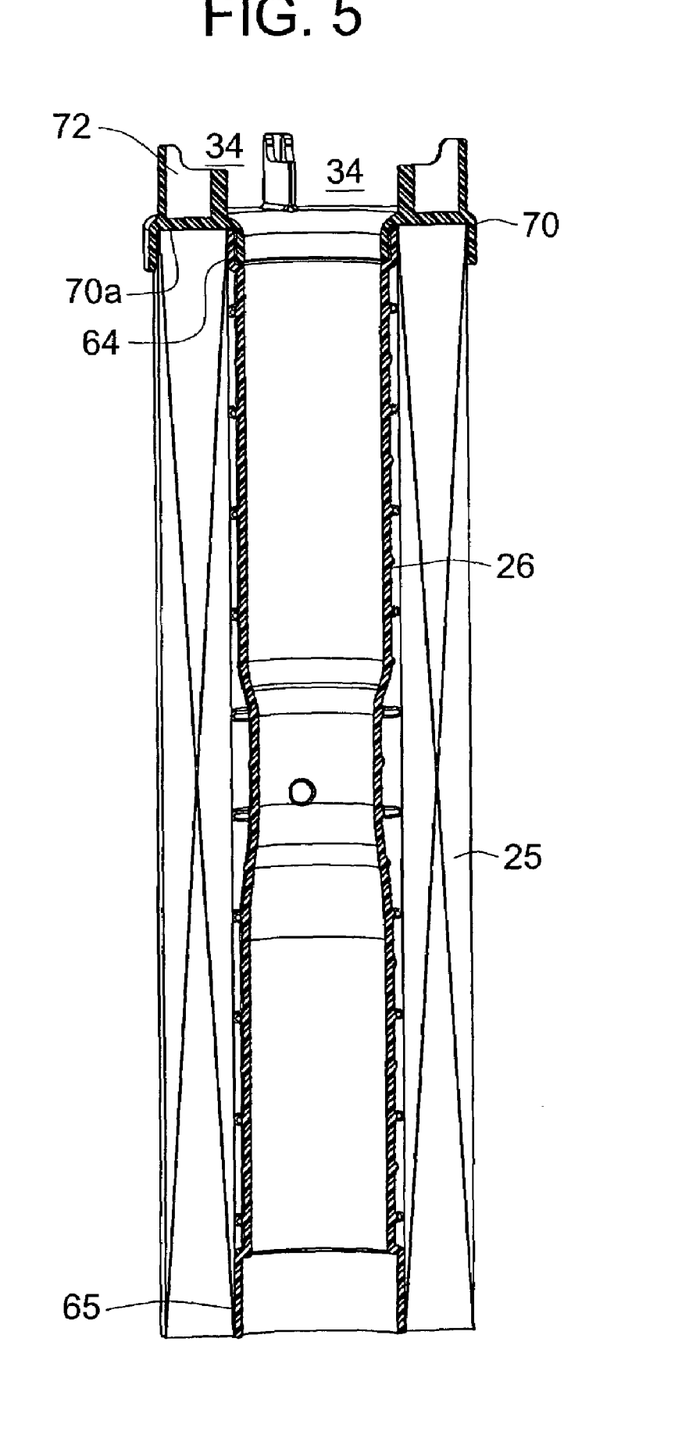
FIG. 5 is an elevational cross-section showing a partial assembly including the venturi centertube and the bypass filter with a first formed endcap.

To form the bypass subassembly, a bypass filter element 25, preferably pleated paper, is fit over the centertube 26 as shown in FIG. 5, and both are fit into a channel 70a in a first endcap 70. Potting compound, such as epoxy, plastisol, hot melt or urethane is introduced into the endcap to seal the pleat ends and the end of the centertube to the endcap. The endcap 70 not only performs its traditional endcap function, but also provides standoffs 72 which tend to form the aforementioned passages 34 for full flow oil to pass around the bypass filter and into the venturi centertube 26.

Figure 6:
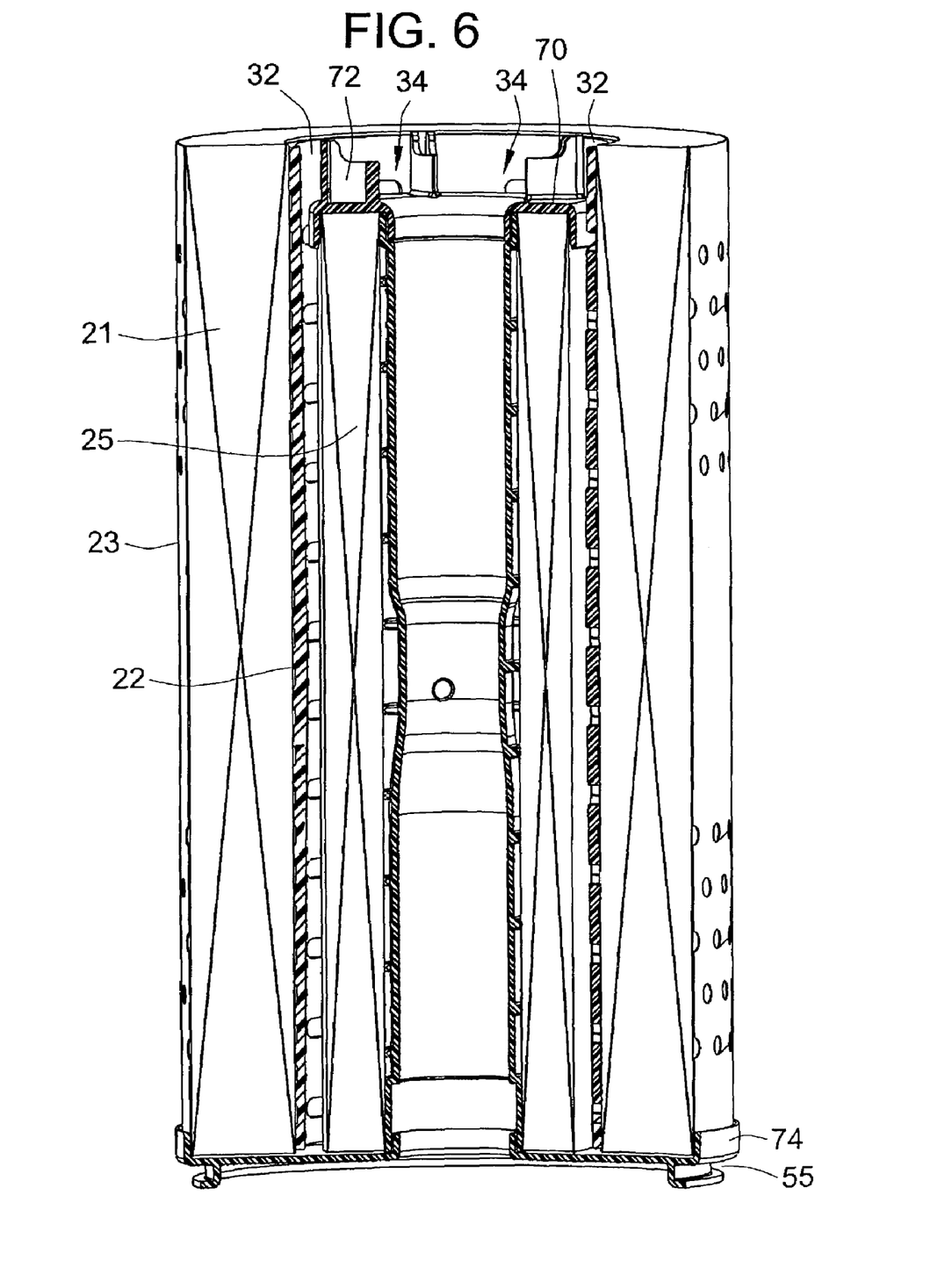
FIG. 6 is another partial assembly showing the addition of the full flow filter with centertube and liner, along with a second potted endcap.

A second subassembly which is conveniently produced is the one including the primary filter 21 supported on a plastic centertube 22 and covered by an overwrap 23. FIG. 6 shows that subassembly positioned over the bypass subassembly to form a dual concentric filter arrangement. The centertube 22 is of sufficient diameter to create the fluid passageway 32 between the primary and secondary subassemblies. As noted above, the passageway provides for the passage of oil upwardly through the filter and through the passages 34 created by the standoffs 72 of the secondary filter endcap 70. All of the subassembled elements are held together by a second endcap 74 which joins the primary filter subassembly and the secondary filter subassembly. A seal is provided by introduction of potting material as described above. The ends of both filter media packs 21, 25 are sealed and potted into the endcap 74, as are the centertubes and liners associated with respective subassembly, as illustrated in FIG. 6. The assembly of both filter portions onto a substantially planar endcap reduces the cost and complexity of the parts, and simplifies assembly. The endcap 74 also provides an annular groove 55 near its outer periphery, which as has been described provides a mechanism by which a simple radial seal gasket 54 is fixed to the filter cartridge. As shown in FIG. 1, the gasket 54 has a simple depending skirt 76 and a smaller circumferential bead 77 which fits into the groove 55, providing a relatively simple and inexpensive but highly effective radial seal for the filter cartridge. The gasket is sized to require stretching and a positive snap fit within the groove, making for a reliable and secure but simple gasket mount.

Figure 7:
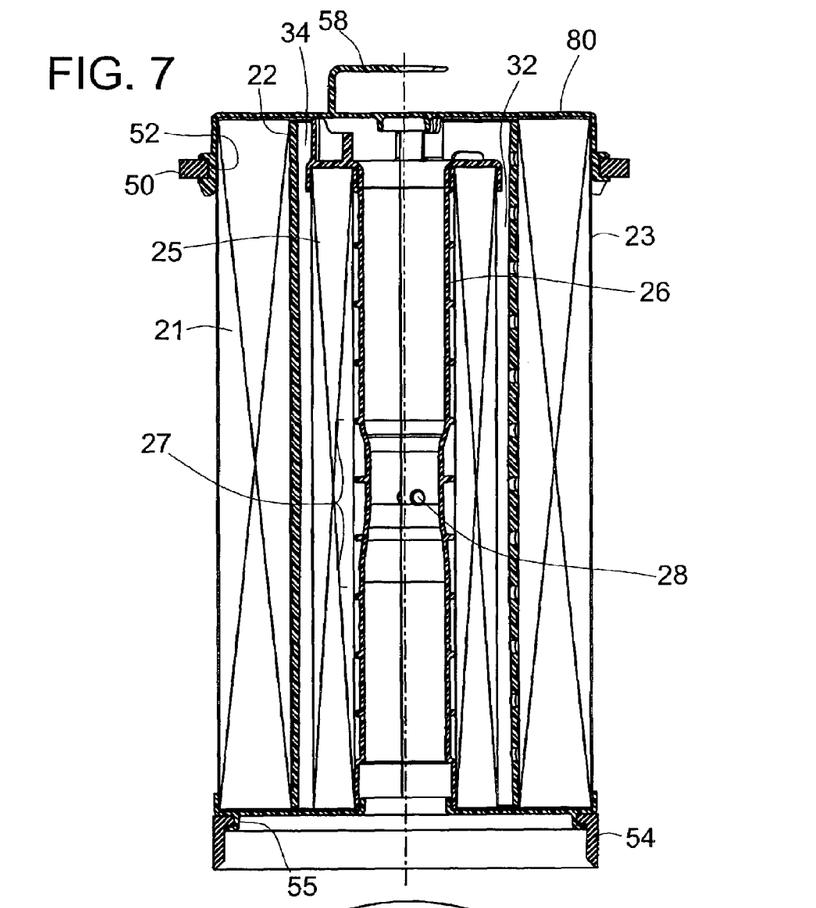
FIG. 7 is an elevational cross-section showing the completed cartridge with the third and final endcap in place.
Figure 8:
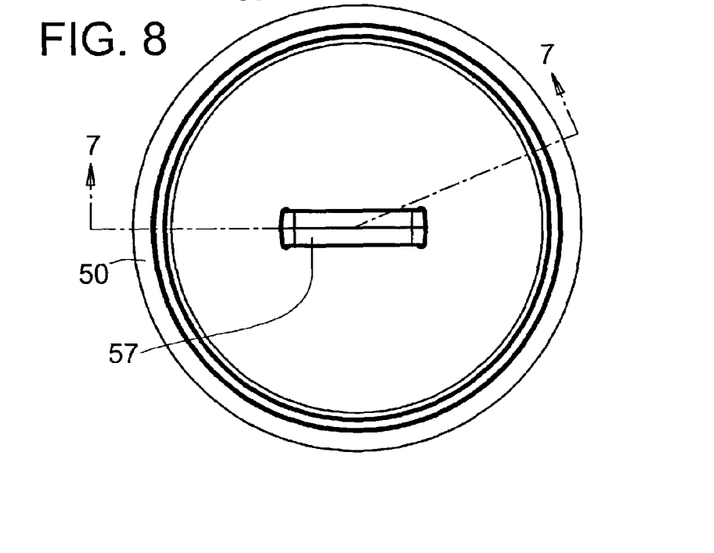
FIG. 8 is a plan view of the filter cartridge showing the line 7—7 along which the sectional view of FIG. 7 was taken.

To seal the upper end of the filter, a third endcap is provided as shown in FIG. 7. An endcap 80 is joined at the top end of the filter to seal the upper end of the filter element 21, and preferably also the liner 23 and plastic centertube 22. The upper end of the bypass subassembly is also secured by way of the upper endcap 80, which contacts the upper portion of the standoffs and fixes them in location. Sealing is accomplished by potting as described above.

Conveniently, the upper endcap 80 has an annular groove 52 at its outer periphery which supports a simple axial seal gasket 50. The groove 52 is formed not unlike the groove 55 of the lower endcap. However, the gasket 50 can be a simple flat annular rubber member which has an inside diameter capable of fitting into the groove 52, and a outside diameter capable of fitting between the elements of the cover and base of the canister. The gasket is sized so that it is stretch fit to positively snap into the groove 52, substantially eliminating the possibility of inadvertently removing it. Using an axial seal gasket is advantageous, in that screwing the cover onto the canister serves to engage the gasket by compressing it only for a portion of the last turn of the cover, in the tightening of the cover onto the housing.

Other features associated with the upper endcap 80 include a handle 58 which provides a reliable means of removing the cartridge from the housing when a filter change is desired. FIG. 3 illustrates a plurality of small triangular projections 82 formed just below the gasket area 50 help to center the upper portion of the cartridge as it is inserted into the canister. In one embodiment projections are located at about 30° intervals around the circumference of the endcap. As shown in FIG. 3 these projections 82 ride along ridge 82b when the filter is inserted in the housing. The bottoms 82a of the projections 82 seat on a ledge 82c of the housing to prevent the downward forces of the filter from crushing it into the housing. One or more radial holes 90 are also formed in the top endcap (see FIG. 1) in order to provide pressure equalization above the upper gasket 50. This is accomplished without providing a leak path between the unfiltered and filtered oil which flows through the filter.

The two seals on the cartridge, namely the radial seal 54 at the lower end and the axial seal 50 at the upper end, are both simple and reliably held in place on the cartridge itself. Both are securely held in place by the aforementioned annular grooves. There is no need for a mechanic to select a particular gasket or to see that a particular gasket is fit into a proper position before attempting to install the filter. With the gaskets already installed as taught herein, and particularly including the simple nature of the gaskets, fitting of the cartridge is almost as simple as changing a spin-in cartridge. The gaskets are carried by the cartridge to their reliable position for installation, usually without fault.

Use of a radial seal as the lower gasket is worthy of note in that the gasket is positioned near the outer periphery of the filter, and the pressure differential serves to enhance the sealing action. The gasket 54 seals radially between itself, the endcap 74 which supports it, and the cartridge housing flange 46 (see FIG. 3). This seal separates the filtered and unfiltered fluid. Use of a radial seal for this component utilizes the pressure differential across the filter to assist the sealing function by forcing the radial seal gasket against both the endcap 74 which supports it and a cartridge housing flange 46 of the filter housing.

The upper axial seal gasket is also note worthy in that it provides the ability for easy removal and replacement of the housing cover. A conventional radial seal gasket at the top would require the use of a wrench and additional effort to remove the cover. The axial seal, while it provides a reliable seal, releases as soon as the cover begins to turn, so that the cap can be easily removed for filter changes.

It will thus be seen that what has been provided is a new and innovative filter cartridge constructed as a dual flow bypass filter, which is environmentally friendly, contains no metal parts, and is relatively simple and inexpensive both to manufacture and to install.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An environmentally friendly dual lube filter cartridge containing no metal parts, and comprising in combination:
   a non metallic venturi centertube having a venturi throat and at least one venturi port,
   a bypass filter coaxial with the venturi centertube, ribs on the venturi centertube for creating a first flow passage between the bypass filter and the venturi centertube for dual filtered fluid,
   a full flow filter having a non-metallic centertube and mounted coaxial with the bypass filter, the full flow centertube having a bore which is larger than the outer periphery of the bypass filter to create a second flow passage for single filtered fluid,
   a first plastic endcap sealing an end of the bypass filter to an end of the venturi centertube, the first endcap having standoffs for creating a flow path for single filtered fluid from the second flow passage to the venturi centertube,
   a second plastic endcap joining the full flow filter, the bypass filter and the venturi centertube, the second endcap having a central passage connected to the venturi centertube for flow of fluid from the cartridge, the second endcap also having an annular groove for receiving a skirt-like radial seal gasket positioned near the periphery of the full flow filter, and a third endcap enclosing the upper end of the cartridge and sealingly joined to the full flow filter element, the standoffs on the first endcap providing flow passages between the bypass element and the third endcap, the third endcap having an annular peripheral groove for carrying an axial seal gasket.

2. The filter cartridge as in claim 1 further including a perforated liner on the outside of the full flow filter.

3. The filter cartridge as in claim 2 wherein the liner has no perforations near the axial center of the filter.

4. The filter cartridge as in claim 1 wherein the third endcap has centering protrusions.

5. The filter cartridge as in claim 4 wherein the centering protrusions have shoulders at their lower ends.

6. The filter cartridge as in claim 1 including a skirt-like annular radial seal gasket having a reduced diameter section sized to seat in the annular peripheral groove in the second endcap so that fluid pressure presses the seal into sealing relationship with the second endcap.

7. The filter cartridge as in claim 6 wherein the radial seal gasket has a reduced diameter portion sized to be stretch fit and snapped into the annular peripheral groove for secure mounting.

8. The filter cartridge as in claim 6 including an annular disc-like axial seal gasket seated in the annular peripheral groove of the third endcap.

9. The filter cartridge as in claim 1 including an annular disc-like axial seal gasket seated in the annular peripheral groove of the third endcap.

10. The filter cartridge as in claim 9 wherein the axial seal gasket is sized to positively snap into the annular peripheral groove for positive retention.

11. The filter cartridge as in claim 9 wherein the third endcap further includes a handle for aiding manual manipulation of the cartridge.

12. The filter cartridge as in claim 1 wherein the third endcap includes at least one pressure relieving port for equalizing pressure on opposite sides of the third endcap.

13. An environmentally friendly dual lube filter cartridge containing no metal parts, and comprising in combination:

a cylindrical bypass filter element mounted on ribs formed on a plastic venturi centertube, a cylindrical full flow filter element surrounding and concentric with the bypass filter, and providing a flow path between the full flow and bypass filters, and a maximum of three plastic endcaps sealing the ends of both said filter elements and including:

a first substantially planar endcap sealing the first ends of both the full flow and bypass filter elements in a common plane, a second internal plastic endcap sealing a second end of the bypass filter and providing concentric standoffs within a bore of the full flow filter, a third plastic endcap sealing the second end of the full flow filter and the standoffs, whereby the standoffs provide a flow path between said flow path and the centertube, and the third endcap having a pressure relief aperture for limiting deflection of the plastic endcap caused by differential pressures in use.

14. The filter cartridge as in claim 13 wherein the first endcap has an annular groove near the outer periphery thereof, and further including a skirt-type radial seal having a mounting bead snap fit into the annular groove.

15. The filter cartridge as in claim 14 in which the third endcap has an annular groove at the outer periphery thereof, and further including a planar axial seal gasket snapped into the annular groove for retention, and providing an axial seal at the upper end of the filter cartridge.

16. The filter cartridge as in claim 15 wherein the third endcap further includes centering protrusions for engaging an opening of a housing to center the cartridge, the protrusions having bases positioned to support the cartridge and the third plastic endcap from the housing to resist deformation of the plastic endcap under operating pressure.

17. The filter cartridge as in claim 13 in which the third endcap has an annular groove at the outer periphery thereof, and further including a planar axial seal gasket snapped into the annular groove for retention, and providing an axial seal at the upper end of the filter cartridge.

18. The filter cartridge as in claim 17 wherein the third endcap further includes centering protrusions for engaging an opening of a housing to center the cartridge, the protrusions having bases positioned to support the cartridge and the third plastic endcap from the housing to resist deformation of the plastic endcap under operating pressure.

* * * * *